No. 739,470. PATENTED SEPT. 22, 1903.
F. A. WEGNER.
COFFEE OR TEA INFUSER AND STRAINER.
APPLICATION FILED NOV. 14, 1902.
NO MODEL.
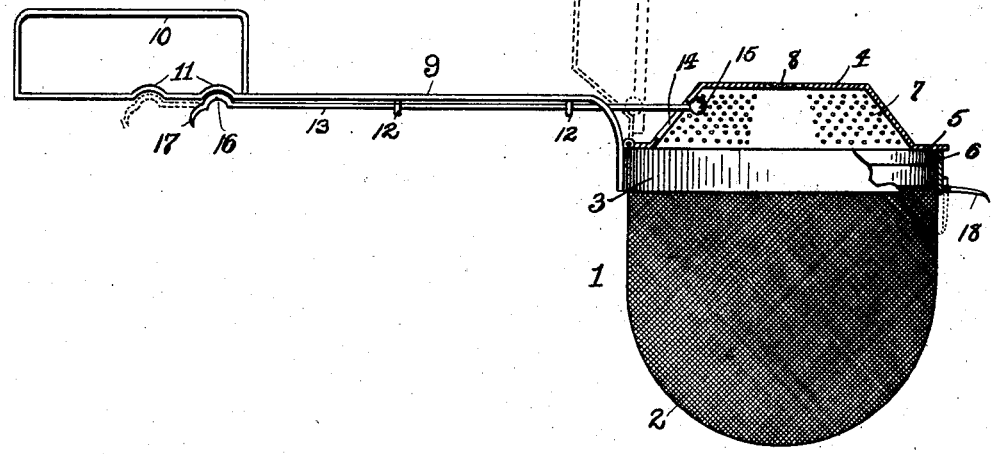
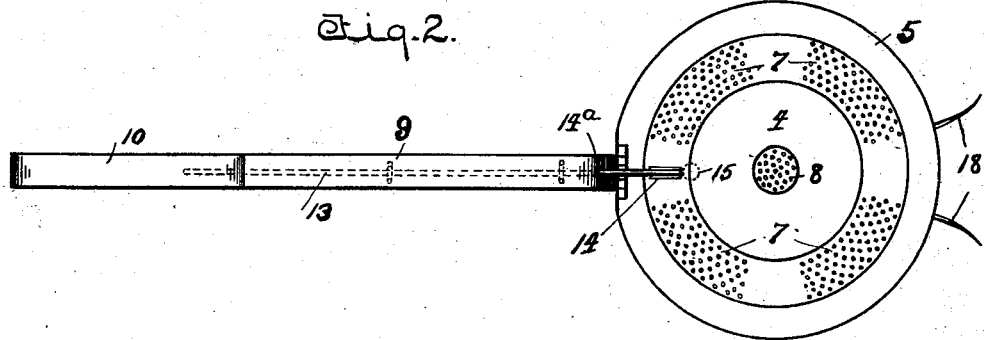
Witnesses:
George Oltsch
Maggie Oltsch
Frederick A. Wegner
Inventor.
By Lehmann & Dalton
Attys.

No. 739,470. Patented September 22, 1903.

UNITED STATES PATENT OFFICE.

FREDERICK ADOLPH WEGNER, OF DETROIT, MICHIGAN.

COFFEE OR TEA INFUSER AND STRAINER.

SPECIFICATION forming part of Letters Patent No. 739,470, dated September 22, 1903.

Application filed November 14, 1902. Serial No. 131,311. (No model.)

*To all whom it may concern:*

Be it known that I, FREDERICK ADOLPH WEGNER, a citizen of the United States, residing at Detroit, in the county of Wayne and State of Michigan, have invented certain new and useful Improvements in Coffee or Tea Infusers and Strainers; and I do hereby declare the following to be a full, clear, and exact description of the invention, such as will enable others skilled in the art to which it appertains to make and use the same.

This invention relates to a coffee or tea infuser and strainer.

The object of the invention is to provide a device which may be used either as a strainer or a percolator for steeping tea or coffee, so that the fluid extract will be free of grounds or sediment and its full aroma retained.

The invention embodies a foraminated receptacle having a handle and a hinged cover, a means on the handle to open the cover, and means to hold the cover open when the device is not in use, so that it may be readily cleaned and hung up to dry, and when used as a strainer the cover is held from interference with the vessel from which the liquid is poured, while suitable extensible hooks are provided for supporting the strainer on the coffee or tea pot.

For a further understanding of the merits and advantages of my invention reference is to be had to the accompanying drawings, wherein—

Figure 1 is a side view showing the cover and the upper edge of one side of the strainer in vertical section, the cover being also shown in dotted lines as opened. Fig. 2 is a plan view of the device.

In carrying out the invention I provide a foraminated receptacle 1, composed of a lower approximately semispherical portion of wire-gauze or other reticulated material 2, secured at its upper edge to an annular rim 3, and a metallic perforated cover 4, which is hinged to the upper edge of the rim 3.

The cover 4 consists of a truncated cone-shaped plate having a flat marginal edge 5, provided with an annular flange 6, which fits into and around the upper edge of the rim 3 when the cover is closed, and in the sides of the cover are sector-shaped groups of small perforations 7, while the top has a central group of perforations 8.

Secured to the periphery of the rim 3 is a handle 9, which extends upwardly and outwardly therefrom and terminates in a rectangular bent portion 10, which serves as a hand-grasp. Near the end of handle are two recesses or indentations 11, and on its lower face are eyes 12, through which the operating-rod for the cover extends.

The operating-rod 13 extends through a slot 14 in the side of the cover and through a perforation 14$^a$ in the upwardly-bent portion of the handle, the round head 15 on the end providing a bearing for the inner edge of the slot when the cover is opened or closed, and the upwardly-bent portion of the handle serves to support and limit the movement of the cover when opened, as shown in dotted lines in Fig. 1. The other end of the rod is provided with a projection 16, which is adapted to engage either of the indentations in the handle, and the extreme end of the rod is curved outwardly and downwardly, as at 17, to permit the finger to be engaged thereby when the rod is pulled to open the cover 4.

When the receptacle 1 is filled with coffee or tea and submerged in the boiling water contained in the pot, the coffee or tea will be steeped, and when removed the fluid extract will be clear of all sediment, obviating the necessity of the usual clearing agents. The coffee or tea may also be steeped by supporting the percolator in the top of the pot, the handle 9 engaging the edge of the same on one side and a pair of hooks 18, which are hinged to the rim 3 opposite the handle, engaging the edge of the pot on the other side. When in such position, the steam arising from the boiling water will condense in the percolator and the extract will drip therefrom, or the boiling water may be poured from a vessel onto the coffee or tea when the cover is opened, and the lower portion 2 then serves as a strainer.

When the cover is closed, the projection 16 of the operating-rod is in engagement with the foremost indentation 11; but by pulling on the rod by the lip 17 the cover will be opened to the position indicated by dotted lines in Fig. 1, and the projection 16 will then be engaged in the other indentation 11, which will hold it in such position, and the receptacle can now be conveniently cleaned or, as before stated, used as a strainer.

Having thus described my invention, what I claim is—

1. A coffee or tea infuser consisting of a foraminated receptacle having a handle provided with recesses, a cover hinged to the receptacle, a reciprocal rod on the handle having one end in engagement with the cover and provided at its other end with a projection adapted to engage either of the recesses to hold the cover in an open or closed position.

2. A coffee or tea infuser consisting of a foraminated receptacle having a handle provided with a hand-grasp at its end and recesses formed therein beneath the hand-grasp, a cover hinged to the receptacle and provided with a slot, a rod reciprocal on the handle and extending through the slot in the cover at one end, a head on the end of the rod to bear against the edges of the slot, a projection on the other end of the rod to engage one of the recesses to hold the cover open, and a finger-grasp for reciprocating the rod.

3. A coffee or tea infuser consisting of a foraminated receptacle, a cover hinged to the receptacle, a handle secured to the receptacle and extending above the same to provide a support and stop for the cover when opened.

4. A coffee or tea infuser consisting of a foraminated receptacle, a cover hinged to the receptacle, a handle secured to the receptacle and bent upwardly and outwardly adjacent to the hinge to provide a stop and support for the cover when opened, a reciprocal rod on the handle having one end in engagement with the cover and means on the other end coöperating with the handle to hold the cover open.

In testimony whereof I affix my signature in presence of two witnesses.

FREDERICK ADOLPH WEGNER.

Witnesses:
JEFFERSON BUTLER,
JENNIE EDWARDS.